United States Patent Office 2,922,737
Patented Jan. 26, 1960

2,922,737
METHODS FOR PRODUCING COLLOIDAL OLIGO-DYNAMIC METAL COMPOSITIONS

Zdenek Vaclav Moudry and Marie Klementine Moudry, Northfield, Ill.

No Drawing. Application May 8, 1956
Serial No. 583,375

4 Claims. (Cl. 167—14)

This invention relates to the production of colloidal metallic copper particles and more particularly to a method for obtaining prompt and complete reduction of cupric salts in aqueous media. In its most advantageous form, the invention deals with the preparation of aqueous, oligodynamic dispersions containing both elemental copper and elemental silver microparticles. This application is a continuation-in-part of our co-pending application, Serial Number 343,705, filed March 20, 1953.

It has long been recognized that copper microparticles are particularly effective in combatting objectionable organisms, and particularly in controlling bacteria and algae. It has, however, heretofore been quite difficult to produce dispersions containing copper microparticles in effective amounts. Stable dispersions of other oligodynamic metals, such as silver, are conventionally prepared in a relatively simple manner by reducing a soluble salt of the oligodynamic metal in aqueous medium in the presence of a protective colloid. However, attempts to carry out this process with a cupric salt have been largely unsuccessful. For this reason, relatively complicated procedures have been employed in an attempt to obtain oligodynamic copper, as seen, for example, in U.S. Patent 2,072,808, issued March 2, 1937, to Rudolph S. Bley.

We have discovered that ionic copper may be promptly and completely reduced to the metallic state if reduction is carried out simultaneously with the reduction of silver in the same aqueous medium. Thus, if an aqueous solution of a water soluble cupric salt selected from the group consisting of cupric nitrate and copper sulfate or such a solution wherein the copper has been reduced to the cuprous state, is combined with silver nitrate and is then subjected to reduction by means of actinic light or a chemical reducing agent, both the silver and the copper will be simultaneously reduced to the metallic state.

The phenomenon upon which the invention is based will be understood when the following two examples are compared:

Example I 10 g. of cupric nitrate was dissolved in 100 cc. of a 20% aqueous solution of hydroquinone as a reducing agent. Maintaining the solution at room temperature, it was observed that the blue color, characteristic of cupric copper, remained, even after prolonged agitation. The solution was heated to 60° C., with no observable change, and then to 85° C., at which temperature the solution exhibited a green color indicating reduction of the cupric copper to cuprous copper. The 85° C. temperature was maintained for 10 minutes without any observable precipitation of metallic copper. An excess of solid hydroquinone was then added without effect.

Example II 10 g. of cupric nitrate was dissolved in 100 cc. of distilled water. 30 g. of silver nitrate was then added and the solution stirred until the salts were completely dissolved. To this solution, exhibiting the characteristic blue color of cupric copper, was then added 50 cc. of 20% aqueous hydroquinone solution. An immediate precipitation of gray metal was observed and, within a few minutes, the supernatant liquid was straw-colored, with no trace of blue. A portion of the supernatant liquid was decanted and tested for ionic copper, the results being negative.

It is thus apparent that neither cupric copper nor cuprous copper will reduce to the elemental states, even when treated with an excess of hydroquinone, when the copper solution contains no silver. However, when silver is present and is reduced by the hydroquinone, the copper is also simultaneously and completely reduced to the elemental state. While the reason for this phenomenon is not definitely known, it appears most likely that, when ionic silver is present, an oxidation-reduction system is established, with the silver supplying an electron necessary to form elemental copper from cuprous copper.

Reduced copper and silver prepared in accordance with Example II is of course not especially suited for use in controlling micro-organisms, since the metals are precipitated and the particle size of the metals is not controlled. Wherever it is satisfactory to obtain copper and silver particles which are of widely varying size and which agglomerate and precipitate, the procedure of Example II may be employed, and the relative proportions of the cupric and silver salts are not critical, so long as the silver salt is present in an amount at least about equal to that of the cupric salt.

In preparing oligodynamic compositions which are stable dispersions of metallic copper and silver of controlled particle size, we employ special process conditions and carry out reductions in the presence of a selected gelatin as a protective colloid. The gelatin employed is one which is free of sulfur and ionizable halogen, has a gel strength of 125–250, a viscosity of 20–40 millipoises in 6⅔% aqueous solution at 60° C., a pH of 3–5.5 in aqueous solution, an isoelectric point of pH 7.8–8.3, and an ash analysis of 0.3–2%, the ash being substantially all calcium. This gelatin may be prepared from acid-treated fresh-frozen pork skins by acid hydrolysis of the collagens of the pork skins to gelatin, the characteristics above referred to varying progressively as hydrolysis contines. The selected gelatins may then be withdrawn as a fraction, when the above characteristics have reached the desired values. Such a gelatin is manufactured by Charles B. Knox Gelatine Company, Johnstown, New York, and is available to the trade under the identification Knox Gelatine #841.

In accordance with the invention, we first prepare an aqueous dispersion of such a gelatin in distilled water. In another body of distilled water, we dissolve the cupric and silver salts. The resulting salt solution and the gelatin dispersion are then combined in proportions such that the gelatin comprises 0.5–2.0% by weight of the mixture. The amount of silver nitrate employed may be as much as about 10% by weight of the total mixture, so that complete reduction of the silver will provide a metallic silver content in the composition of about 7% as a maximum. When the invention is employed to produce stable dispersions in this manner, the ratio of silver nitrate or other soluble silver salts to copper salt should be within the range of 1:1–3:1, by weight.

The resulting mixture is then reduced, either by means of actinic light or by any conventional chemical reducing agent. If actinic light is to be employed, irradiation is from a few seconds to about one hour, and advantageously the light should have an intensity of at least 45 milliwatts per square foot, at least 40% of the total radiation being in the infrared portion of the spectrum, at least 25% of the total radiation being in the ultraviolet portion of the spectrum, and the ultraviolet portion of the radiation including a material portion of light omitted at 3130 A.U. and at 3660 A.U.

While any conventional chemical reducing agent may be employed if particle size and stability of the product is not critical, the present invention produces stable dispersions of particles smaller than about 700 A.U. by employing a special chemical reducing medium. This medium comprises equal amounts by weight of sodium sulfite and a reducing agent selected from the group consisting of hydroquinone and tannic acid. Prior to the invention, it has been extremely difficult to obtain reasonably concentrated, stable oligodynamic dispersions by means of chemical reducing agents. It appears that this difficulty arises because, during reduction of the oligodynamic metal, the reducing agent is oxidized, with the production of oxidation products which cause the resulting dispersion to be unstable and to contain metal particles of widely varying and unduly large size. It appears that the sodium sulfite, as employed in the present invention, serves to react with such oxidation products as they are formed and to effectively deactivate them.

Employing such a special reducing medium, the combined weight of the sodium sulfite and the reducing agent should equal 0.5–2% of the weight of silver salt employed. Two other special process conditions are essential in this embodiment of the invention. First, the dispersion of selected gelatin employed must be adjusted to a pH of about 9.3 before it is combined with the salt solution. Next, the reduction must be carried out at a temperature not exceeding about 50° C.

The following example is illustrative of the process as carried out with actinic light:

*Example III*

In 50 cc. of distilled water was dispersed 2.3 grams of a gelatin having a gel strength of 165, a viscosity of 30 millipoises, a pH of 4.44, an isoelectric point of pH 8, and an ash analysis of 1.2%, substantially all of the ash being calcium. Five grams of reagent grade silver nitrate and 1.5 g. of reagent grade cupric nitrate were dissolved in an additional 50 cc. of distilled water. The gelatin dispersion and the salt solution was then uniformly combined and irradiated by means of ultraviolet lamps constructed to emit actinic light having the spectral characteristics hereinbefore specified, the irradiation being at an intensity of about 1,062 milliwatts per square foot and the irradiation time being approximately 15 seconds. Such irradiation resulted in reduction of approximately 95% of the total salts employed. No remaining ionic copper was detected. To remove any remaining ionic silver, the reaction mixture was passed over a conventional de-ionizing resin.

The resulting product was a clear, aqueous dispersion of silver and copper microparticles, substantially all of the particles being smaller than 400 A.U. and a very material proportion of the articles being smaller than 100 A.U. The particles were essentially non-agglomerated and the dispersion stable over long periods of time.

The product of Example III was diluted to a concentration of 1:100,000,000 on a volume basis, the water for dilution including sufficient *Escherichia coli* to give 50,000 organisms per cc. of final liquid. The product was compared with a control composition prepared by reducing an aqueous solution of silver nitrate alone, the solution containing ordinary gelatin, the reducing agent being monoethyl-p-aminophenol sulfate. The control product was also diluted to a concentration of 1:100,000,000 in the same manner as the product of the present example, so that the diluted control product included the same concentration of *Escherichia coli*. Both test samples were allowed to stand for a period of 24 hours and were then tested for living organisms by accepted procedures. Repeated tests showed no viable organisms in the product of the present example, while many viable organisms were found to exist in the control product.

The following example is illustrative of the present process as carried out with a chemical reducing agent.

*Example IV*

One gram of the gelatin of Example III was dispersed in 100 cc. of distilled water and the pH of the resulting dispersion adjusted to a pH of about 9.3 by addition of sodium hydroxide. Two grams of silver nitrate and 1 g. of cupric nitrate were dissolved in an additional 100 cc. of distilled water and 50 cc. of this solution combined, at a temperature not exceeding 50° C., with the total amount of gelatin dispersion. To this mixture was then added 2 cc. of a reducing solution comprising 1 g. of hydroquinone and 100 cc. of distilled water. The resulting mixture, still maintained at a temperature not exceeding 50° C., was then stirred for 5 minutes to effect complete reduction of the silver and copper. Before addition of the reducing medium, the mixture exhibited the characteristic blue color of cupric copper. After the reducing medium was added, this blue color progressively disappeared. At the end of the 5 minutes mixing period, the resulting dispersion was opalescent and free from unreduced silver and copper. The total amount of silver and copper was present as microparticles within the range of 200–700 A.U. Diluted with water in proportions on the order of 1:500,000, the composition was colorless and invisible, reflecting no yellow or green light and therefore avoiding the common objection to most oligodynamic algaecides when applied to treat swimming pool waters and the like.

*Example V*

The procedure of Example IV is repeated, using tannic acid as the reducing agent in place of the hydroquinone. The same amount by weight of tannic acid is employed, and the resulting product is substantially identical with that obtained in Example IV.

The following example illustrates an alternative procedure wherein the solution of cupric salt is first reduced to the cuprous state before the silver salt is added:

*Example VI*

One hundred cc. of the same gelatin dispersion described in Example IV was prepared and adjusted to a pH of 9.3. One gram of cupric nitrate was dissolved in 100 cc. of distilled water and 50 cc. of this solution combined, at a temperature not exceeding 50° C., with the total amount of the gelatin dispersion. To this mixture was then added 2 cc. of a reducing solution comprising 1 g. of hydroquinone and 100 cc. of distilled water. The resulting mixture was then stirred for 5 minutes, during which time the color changed from the characteristic blue of cupric copper to the greenish color indicative of cuprous copper. One gram of silver nitrate was then added to the mixture and the mixture stirred for an additional five minutes, during which time both the silver and copper salts were completely reduced to provide metallic silver and copper, the greenish color disappearing completely. The resulting composition has all of the characteristics of Example IV.

In the foregoing examples, the cupric nitrate can be replaced by an equivalent amount of copper sulfate.

It has been demonstrated that at least a material proportion of the microparticles produced by the method of Examples III—IV are composite, and contain the metals of each salt in elemental, but physically combined, form. The configuration of these composite particles is substantially the same as that of an alloy. Analysis of a considerable number of reaction mixtures produced in accordance with the general procedure hereinbefore described indicates that the amounts of silver and copper which combine to form composite microparticles correspond to the proportions in which these metals normally alloy, any excess being reduced to microparticulate silver and copper, respectively. A further indication of the fact that the metals are physically combined in at least a substantial proportion of the resulting particles is the fact that, though a copper salt may be employed in considerable amount, the proportion of gelatin necessary to maintain the resulting microparticles in stable dispersion need not be increased over that proportion required if a silver salt alone is employed.

Reference is made to my co-pending application, Serial Number 583,376, filed of even date herewith. Said application relates to the preparation of algaecides and bactericides containing both copper and silver by chemical reduction with the special chemical reducing medium hereinbefore described. Said co-pending application claims a particular embodiment of such process wherein the metallic content of the compositions produced is in the form of microparticles within the range of 200–700 A.U., and the compositions have characteristics particularly adapting them for use in the treatment of swimming pool waters and the like, where the reflection of yellow or green light is objectionable.

We claim:

1. A method for producing stable aqueous oligodynamic metal dispersions wherein the oligodynamic metal is in the form of microparticles predominantly of a size range of from 200 A.U. to 700 A.U., comprising forming an aqueous solution of silver nitrate and a water soluble cupric salt selected from the group consisting of cupric nitrate and copper sulfate, uniformly combining a protective gelatin in said solution, and simultaneously reducing said silver nitrate and cupric salt to form both elemental silver and elemental copper, the proportion of silver nitrate being significant and not exceeding about 10% of the total weight of water, protective gelatin and salts employed, the weight ratio of silver nitrate to said cupric salt being from about 1:1 to about 3:1, the protective colloid amounting to 0.5–2.0% of said total weight, and said step of reducing the salts being effected by actinic light having an intensity of at least 45 milliwatts per square foot, at least 40% of the total radiation being in the infrared portion of the spectrum, at least 25% of the total radiation being in the ultraviolet portion of the spectrum, and a material proportion of the ultraviolet portion of the radiation being emitted at 3130 and at 3660 A.U., the resulting oligodynamic metal microparticles being predominantly of a size range of from 200 A.U. to 400 A.U.

2. The method of claim 1 wherein (1) said protective gelatin is a gelatin having a viscosity of 20–40 millipoises in 6⅔% aqueous solution at 60° C., a pH of 3–5.5 in aqueous solution, and an isoelectric point of pH 7.8–8.3, said gelatin being free from sulfur and ionizable halogen, and (2) said reducing step is carried out by irradiating said solution with actinic light having an intensity of at least 45 milliwatts per square foot, at least 40% of the total radiation being in the infrared portion of the spectrum, at least 25% of the total radiation being in the ultraviolet portion of the specrum, and a material proportion of the ultraviolet portion of the radiation being emitted at 3130 and at 3660 A.U., the resulting oligodynamic metal microparticles being predominantly of a size range of from 200 A.U. to 400 A.U.

3. The method of claim 1 wherein (1) said reducing step is carried out by incorporating in said solution a mixture of equal amounts of sodium sulfite and a member of the group consisting of hydroquinone and tannic acid, said mixture amounting to 0.5–2.0% of the weight of silver nitrate employed, and (2) the resulting aqueous mixture is maintained at a temperature less than about 50° C. during reduction of said silver and copper salts by said reducing agent, the resulting oligodynamic microparticles being predominantly of a size range of from 200 A.U. to 700 A.U.

4. A method for producing stable aqueous oligodynamic metal dispersions wherein the oligodynamic metal is in the form of microparticles predominantly of a size range of from 200 A.U. to 700 A.U., comprising forming an aqueous solution of silver nitrate and a water soluble cupric salt selected from the group consisting of cupric nitrate and copper sulfate, uniformly combining a protective gelatin in said solution, and simultaneously reducing said silver nitrate and cupric salt to form both elemental silver and elemental copper, the proportion of silver nitrate being significant and not exceeding about 10% at the total weight of water, protective gelatin and salts employed, the weight ratio of silver nitrate to said cupric salt being from about 1:1 to about 3:1, the protective colloid amounting to 0.5–2.0% of said total weight, and said step of reducing the salts being effected by a reducing agent wherein are used equal amounts of a mixture of sodium sulfite and a member selected from the group consisting of hydroquinone and tannic acid.

References Cited in the file of this patent

UNITED STATES PATENTS

| 2,132,886 | Voelker | Oct. 11, 1938 |

FOREIGN PATENTS

| 431,656 | Great Britain | July 12, 1935 |
| 593,394 | Great Britain | Oct. 15, 1947 |

OTHER REFERENCES

Yagi: Rev. Phys. Chem., Japan, vol. 14, 1940, pp. 115–127; thru Chem. Abs., vol. 35, p. 4264.

The Glass Ind., vol. 26, No. 3, March 1945, pp. 136–142, p. 138 pert.